United States Patent [19]
Knapp

[11] 4,340,179
[45] Jul. 20, 1982

[54] LAWN AND GARDEN FEEDING APPARATUS

[76] Inventor: Philip B. Knapp, 40 Reyam Rd., Lynbrook, N.Y. 11563

[21] Appl. No.: 144,851

[22] Filed: Apr. 29, 1980

[51] Int. Cl.³ .............................................. A62C 5/02
[52] U.S. Cl. ...................................... 239/310; 47/48.5
[58] Field of Search .............................. 239/310–316; 47/48.5

[56] References Cited

U.S. PATENT DOCUMENTS

| | | | |
|---|---|---|---|
| 3,083,916 | 4/1963 | Neel | 239/310 X |
| 3,460,562 | 8/1969 | Moulder | 47/48.5 X |
| 3,937,399 | 2/1976 | Halley | 239/310 X |
| 4,051,628 | 10/1977 | Knapp | 47/48.5 |

Primary Examiner—Robert B. Reeves
Assistant Examiner—Gene A. Church
Attorney, Agent, or Firm—Edward F. Levy

[57] ABSTRACT

A lawn and garden feeding apparatus includes a container made of transparent plastic, having inlet and outlet hose connections and a disposable cartridge which is inserted into the container. The cartridge comprises a gel with plant nutriment and a water soluble dye suspended therein with the cartridge fitting the inside of the container and having a bore communicating with the inlet and outlet connections. The container inlet is connected by a garden hose to a source of water and the outlet is connected by a hose to a conventional sprinkler or nozzle so that in use of apparatus, water flows through the cartridge bore drawing nutriment and dye from the gel in micro-feeding amounts, and is discharged through the sprinkler or nozzle. Extraction of dye from the gel, after a selected period of time, results in a perceptible change in gel color, indicating that the cartridge requires replacement.

12 Claims, 8 Drawing Figures

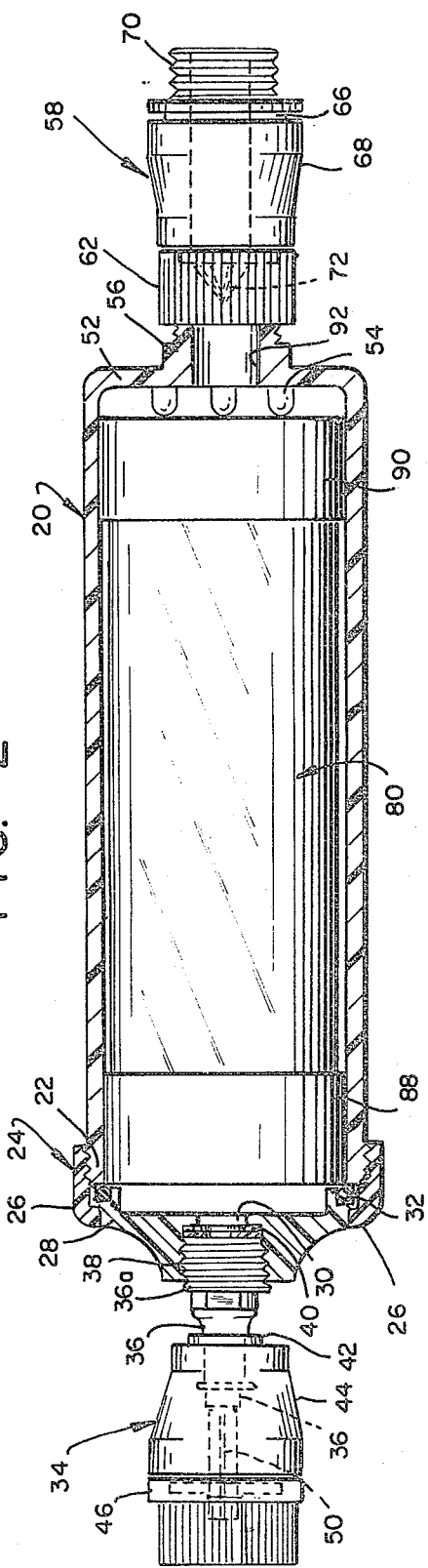
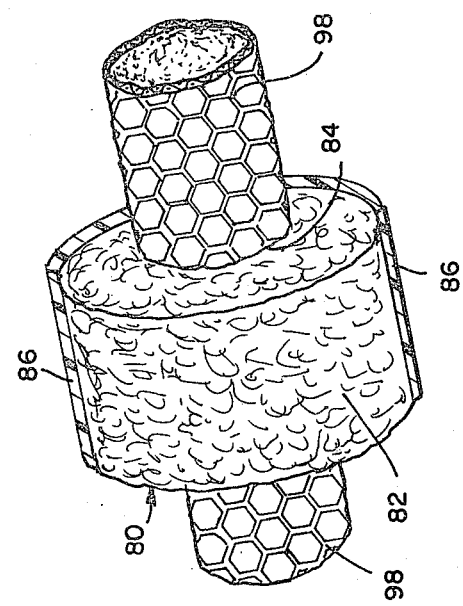
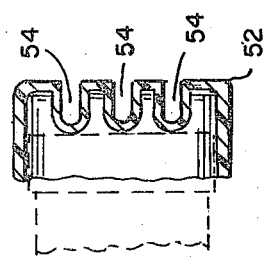
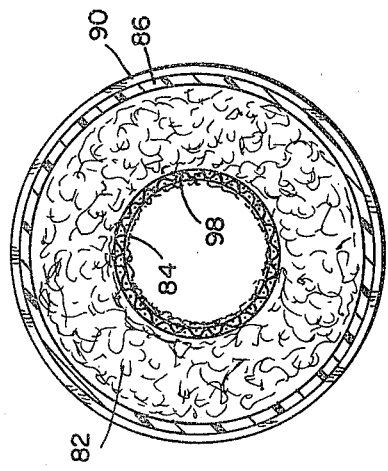

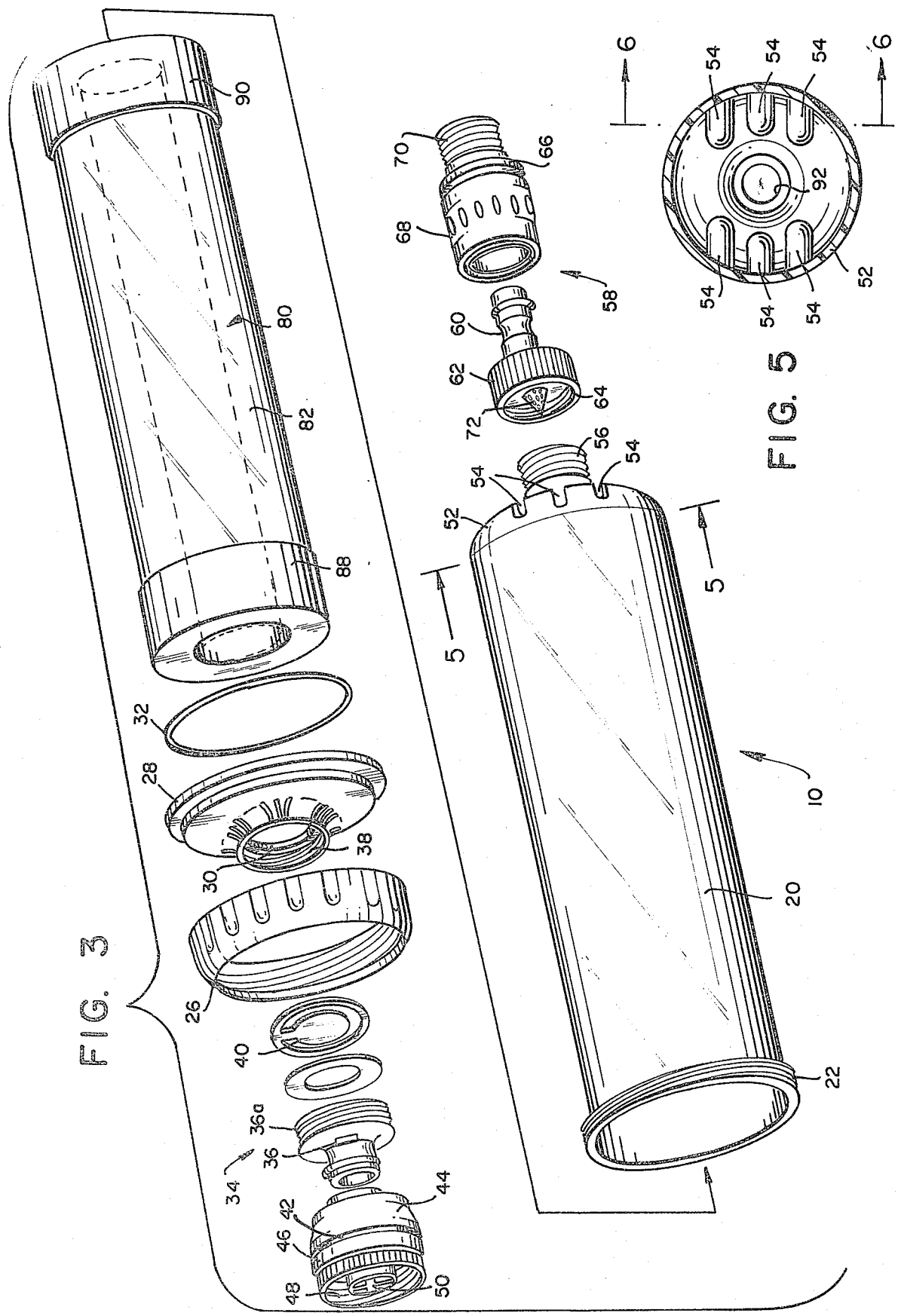

LAWN AND GARDEN FEEDING APPARATUS

The present invention relates to improvements in lawn and garden feeding methods and apparatus, and in particular, relates to novel and improved assembly which is attachable within a conventional water sprinkling system and is automatically operative to supply lawns, gardens, or the like with nutriments in precise micro-feeding amounts each time that the plants are watered.

The fertilizing of garden plants or lawn grass has always presented a problem to home owners because of the difficulty in applying the correct amount of nutriment to the plants being fed. Fertilizer is usually supplied in solid form in which it is spread on the ground surrounding the plant, or in water soluble form for mixing with water which is then poured on the ground area surrounding the plant. In either of these methods, difficulty is inevitably encountered in maintaining the proper supply of nutriment required by the plants or lawn, with the result that at times an over-supply of nutriment is provided, which is harmful to the plant roots, and at other times an insufficient amount of nutriment is available for proper fertilization.

The application of dry solid fertilizer usually results in an uneven distribution over the ground area, causing burning of lawns or damage to some of the plants. In addition, during heavy rains, dry fertilizer will run off and be lost and wasted. These disadvantages are alleviated by the use of water soluble chemical fertilizers dissolved in water, but their use has been hampered by the lack of suitable application equipment.

Liquid fertilizers have the advantage of being capable of providing nutriment to both the leaves and the roots of plants and decreasing the tendency to run off after heavy rains. In addition, liquid fertilizers can be distributed and stocked in concentrated form and do not require the transportation and stocking of awkward and bulky bags of product, thus resulting in a potential saving in transport and warehousing costs. Despite these advantages, liquid fertilizers have not been subject to widespread consumer acceptance, largely because of the lack of appropriate apparatus which can dispense the fertilizer in a uniform manner and in optimum amounts, and the necessity for properly mixing the fertilizer concentrate with water to achieve the proper proportions. The mixing procedures have until now been both awkard and time consuming, resulting in a natural reluctance to perform such mixing among many potential consumers who are not familiar with the handling of concentrated chemicals and the preparation of dilute solutions suitable for use.

The invention herein contemplates the provision of water soluble nutriment suspended in concentrated form within a hydrophilic gel carrier. The nutriment-saturated gel is placed in communication with a water conduit leading to a sprinkler system, in such a manner that as water flows to sprinkle the lawn or garden, the gel carrier releases nutriment in small precise quantities into the water.

The use of water soluble chemical fertilizers in a hydrophilic gel carrier is disclosed in U.S. Pat. No. 4,051,628 to Philip B. Knapp et al., issued Oct. 4, 1977 and entitled "Apparatus for the Improved Dispensing of Plant Nutriments". The apparatus of this patent comprises a sealed container provided with a probe which is inserted below the surface of soil in a flower pot or other container in which a house plant is growing. The container probe has a dispensing aperture which is of critical size larger than capillary. The container is filled with a hydrophilic gel, within which is dissolved a soluble nutriment component, preferably in saturation quantities. As water is provided to the growing plant during normal watering procedures, a quantity of nutriment is leached from the gel and serves to enrich the soil surrounding the plant roots, so as to fertilize an area immediately surrounding the probe.

The aforementioned apparatus of U.S. Pat. No. 4,051,628 is adequate for the fertilization of relatively small containers such as potted plants, but is not adaptable to the fertilization of extended areas such as lawns or gardens.

It is an object of the present invention to provide an apparatus for automatically fertilizing lawn and garden areas using water soluble fertilizer.

Another object of the invention is to provide an apparatus which eliminates the need for mixing liquid fertilizers with water to achieve proper chemical concentrations and which dispenses properly mixed liquid fertilizer in a uniform manner.

Another object of the invention is to provide a lawn and garden feeding apparatus which eliminates the need for mixing, measuring or handling of liquid chemical fertilizers or the handling of heavy bags of dry chemical fertilizer.

Another object of the invention is to provide a lawn and garden feeding apparatus which is adapted for use in combination with a conventional garden sprinkler.

Another object of the invention is to provide a lawn and garden feeding apparatus which utilizes individual component cartridges which contain the proper chemicals for an individual fertilizer requirement such as lawns, flower gardens and vegetable gardens with the cartridges being easily changed to provide the optimum fertilizer for each type of application.

Another object of the invention is to provide a lawn and garden feeding apparatus which may be conveniently used to provide frequent small quantity feedings which are more effective than infrequent massive feedings.

Another object of the present invention is to provide a lawn and garden feeding apparatus which is able to efficiently fertilize both the roots and the foliage of plants.

Another object of the invention is to provide a lawn and garden feeding apparatus which completely eliminates the need for manipulation of chemicals and is therefore safer to use than conventional devices.

Another object of the present invention is to provide a lawn and garden feeding apparatus which dispenses measured amounts of fertilizer along with water and thus evenly fertilizes an area being watered, thereby eliminating burning due to over-concentration of chemicals. The dispensing of the fertilizer is in micro-feeding amounts, that is, minute amounts of fertilizer per million parts of water.

Another object of the invention is to provide a lawn and garden feeding apparatus which comprises relatively few parts which are economical of manufacture and relatively low in cost.

In accordance with the present invention, there is provided a reusable plastic container and disposable cartridges which contain nutriments. The container comprises a hollow cylindrical body which is made of transparent plastic, and has an open end on which a cap is attached. The cap is removable for the insertion and removal of the contained cartridge. The cap has a central opening which communicates with a snap-fit hose coupling serving as the water inlet. At its other end, the container has an outlet opening which includes a snap-fit hose coupling. A garden hose is connected to the inlet hose coupling and leads to a source of water. A second garden hose is connected to the coupling at the outlet of the container and leads to a sprinkler or nozzle.

The cartridge consists of a solid core in tubular form and comprises a plant support reagent such as fertilizer or other nutriment suspended in a gel. The core has a longitudinal bore through which the flow of water is directed. The core is encased in a thin transparent wrapper and a pair of end caps. This wrapper enables the cartridge to be handled freely without danger of the chemicals contacting the hands. When the water is turned on, it flows through the bore, drawing nutriment from the gel and then is sprayed on the lawn or garden by the sprinkler.

Additional objects and advantages of the present invention will become apparent during the course of the following specification when taken in connection with the accompanying drawings, in which:

FIG. 2 is an enlarged longitudinal cross-sectional view of the lawn and garden feeding apparatus of FIG. 1 taken along the line 2—2 of FIG. 1;

FIG. 3 is an exploded view of the apparatus of FIG. 2, showing details of internal construction;

FIG. 5 is a section showing the end of the container casing, as taken along line 5—5 of FIG. 3;

FIG. 6 is a fragmentary cross-sectional view of the casing taken along the line 6—6 of FIG. 5;

FIG. 7 is a transverse cross-sectional view of the cartridge taken along the line 7—7 of FIG. 4; and, FIG. 8 is a fragmentary perspective view of the cartridge of FIG. 4 with portions shown broken away to reveal details of internal construction.

Figure 1:
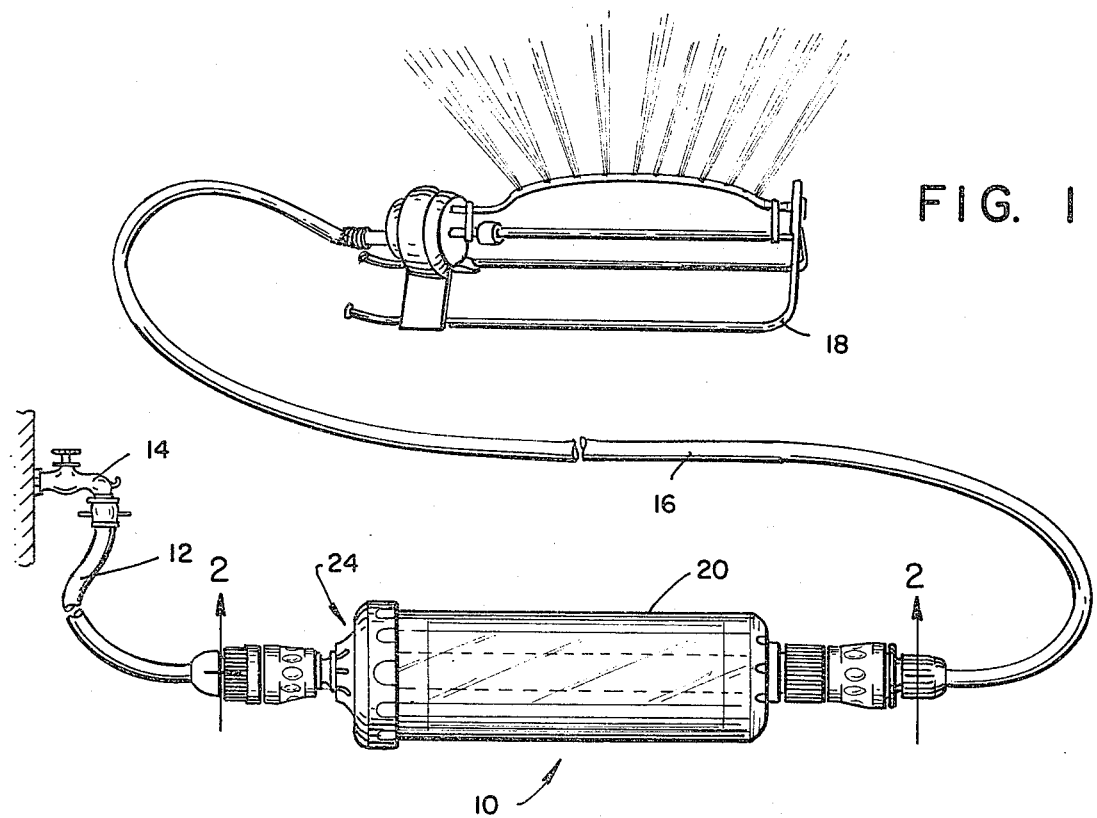
FIG. 1 is a perspective view of a lawn and garden feeding apparatus made in accordance with the present invention, with the apparatus shown in use, connected to a water faucet and to a conventional lawn sprinkler.

Referring in detail to the drawings, there is shown in FIG. 1 a lawn and garden feeding apparatus 10 made in accordance with the present invention, with the apparatus shown in use, connected to a first hose 12 which is coupled to a water faucet 14 and to a second hose 16 which leads to a conventional lawn sprinkler 18. The apparatus 10 receives water from the first hose 12 and dispenses the water together with water-soluble plant nutriment through the lawn sprinkler 18.

The apparatus 10 is best shown in FIGS. 2 and 3 and comprises a hollow cylindrical container 20 which is preferably made of a rigid transparent plastic, and which has a threaded open end 22 on which a cap assembly 24 is mounted. The cap assembly 24 includes a threaded collar 26 which fits over the end 22 of the container 20 and which holds a cap 28 having a central opening 30 which serves as a water inlet. An O-ring seal 32 fits between the collar 26 and the container 20 as is shown in FIG. 2. A hose coupling assembly 34 is releasably mounted on the cap 28 in communication with the water inlet opening 30.

The hose coupling assembly 34 comprises a nipple 36 having an enlarged threaded end 36a which is received within internal screw threading 38 of the cap 28 surrounding the inlet opening 30. When the nipple 36 is in its mounted position on cap 28, it holds a flap valve 40 and associated washer 41 sealed within the cap 28 and overlying the inlet opening 30. The flap valve 40 serves as a check valve to enable water to flow freely from the faucet hose 12 into the container 20, but to prevent backflow of the mixed fertilizer solution from the interior of container 20 to the faucet hose 12, thereby preventing possible contamination of the water supply.

The hose coupling assembly 34 also includes a tubular coupling element 42 adapted to be releasably attached at one end to the nipple 36 by a snap fit. Slidably mounted on the coupling element 42 is a spring-biased sleeve 44 which may be manually slid rearwardly upon the coupling element 42 to release its snap-fit grip upon the nipple 36 and enable the coupling element to be detached from the nipple. At its opposite end, the coupling element 42 is formed with an end portion 46 of enlarged diameter having internal threading 48 for attachment to the hose 12. Within this enlarged end portion 46 is mounted a slide valve 50. When the coupling element 42 is mounted on the nipple 36 by a snap-fit, the end of the nipple engages the slide valve 50 and presses the latter outwardly to an open position in which water can flow freely from feed hose 12 through the coupling assembly 34. When the coupling element 42 is unlocked and removed from the nipple 36, the slide valve 50 is released, and the pressure of water in the hose 12 slides the valve 50 inwardly to a closed position in which it prevents the water in hose 12 from escaping through the coupling element 42.

At its opposite end, the container 20 is formed with a convoluted end wall 52 which is best shown in FIGS. 5 and 6. The convolutions 54 lend rigidity to the end of the container 20, thereby preventing deformation due to the force of the water flowing through the apparatus 10. At its central portion, the wall 52 is formed with a threaded collar 56 upon which a hose coupling assembly 58 is mounted. The hose coupling assembly 58 includes a nipple 60 terminating in an enlarged extension 62 having internal threading 64 for attachment to the threaded collar 56. The assembly 58 also includes a tubular coupling element 66 adapted to be releasably attached at one end to the nipple 60 by a snap-fit. Slidably mounted on the coupling element 66 is a sleeve 68 which is spring-biased inwardly to a position in which it locks the coupling element 66 in mounted position upon the nipple 60. The sleeve 68 may be slid outwardly to a position in which it unlocks the coupling element 66 and permits the latter to be removed from the nipple 60. The opposite end of the coupling element 66 is formed with threading 70 for attachment to the sprinkler hose 16. Centrally mounted within the enlarged extension 62 of the nipple 60 is a conical screen 72 which serves as a filter for preventing solid particles from leaving the container 20. In use, the garden hose 12 leading from the water faucet 14 is connected to the coupling assembly 34, and the garden hose 16 leading to the sprinkler 18 is connected to the coupling assembly 58, as is shown in FIG. 1.

Figure 4:
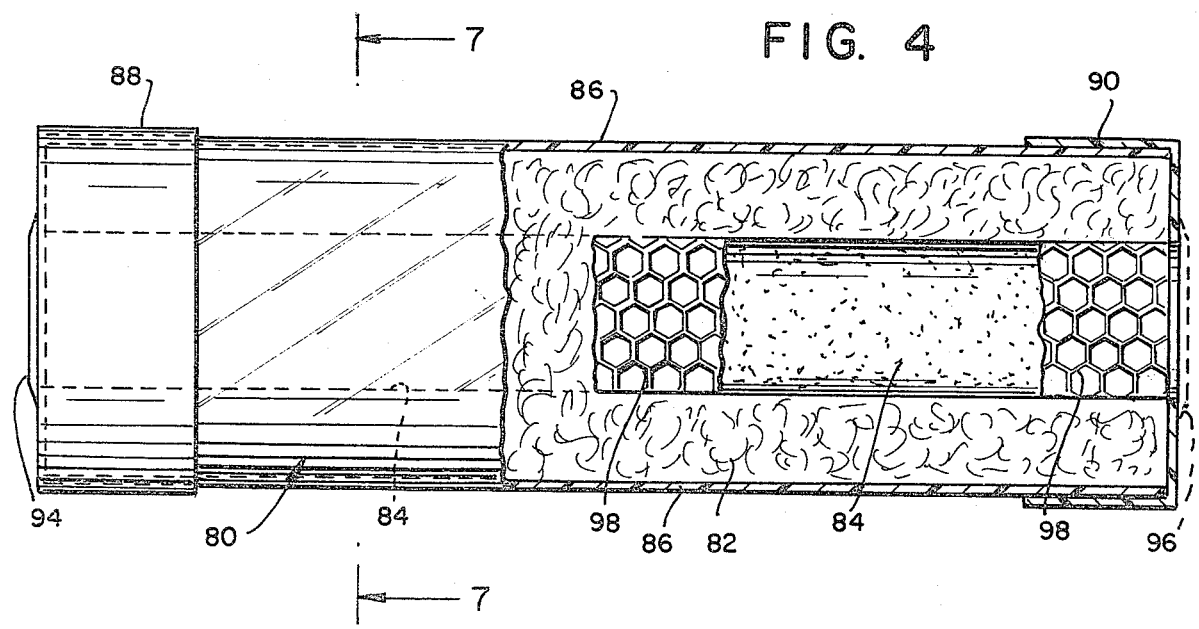
FIG. 4 is an elevational view of the fertilizer cartridge shown removed from the apparatus of FIG. 1, with portions thereof broken away and shown in section to reveal inner constructional details.

The container 20 encloses a removable cartridge 80 which forms a principle novel feature of the present invention. The cartridge 80 is best shown in FIG. 4 and comprises a solid core 82 in tubular form comprising plant nutriment or other plant support reagent suspended in a gel. The composition and construction of the cartridge 80 will presently be described in detail.

The core 82 is molded with a through longitudinal bore 84 through which water is directed. The core 82 is encased in a thin plastic wrapper 86 having end caps 88,90. This wrapper 86 enables the cartridge 80 to be handled freely without any danger of the fertilizer chemicals contacting the hands.

The cartridge 80 is sized to fit snugly within the container 20 with the longitudinal bore 84 registering with the inlet and outlet openings 30,92. When water enters the container 20 it flows through the bore 84 drawing nutriment from the gel of the cartridge core 82, and it is then sprayed on the lawn or garden by the sprinkler 18.

The cartridge 80 is designed to have ten to twelve hours of useful life during which time it releases nutriment in the proper proportions to the stream of water flowing therethrough. If the cartridge is removed after a shorter time, plugs 94 and 96 may be inserted in the end caps 88,90, as shown in FIG. 4, so that the cartridge may be stored until used again.

In the preferred embodiment of the invention, the surface of the longitudinal bore 84 has embedded therewithin a cylindrical tube of plastic or wire netting 98 as is shown in FIG. 8. This netting 98 serves to support the core material and fortifies the longitudinal bore 84 to prevent the latter from collapsing under the force of the water flowing therethrough.

The core 82 is made of a gel in which is suspended a plant support reagent which may be a grass, or flower or vegetable plant nutriment formulation. Alternatively, the reagent may be a pesticide formulation such as a systemic poison for insect control or a combination of the above ingredients. The gel system is, in general, similar to the gel system described in the Knapp et al. U.S. Pat. No. 4,051,620. The present gel system differs from that of U.S. Pat. No. 4,051,620 in that a higher quantity of suspended nutriment is contained in the gel by suspending in the gel not only a saturated solution of the nutriment in water, but also solid undissolved treatment. Also a quantity of floc or fibrous material is suspended in the gel to act as a reinforcing matrix to prevent the gel from breaking up under the force of the water flow, and also to provide channels for diffusion of water through the body of the core so that the contained nutriment may be brought out.

In a preferred embodiment of the invention a water soluble dye is added to the gel mass, preferably of a green color. As water flows through the longitudinal bore 84, the loss of color of the gel, when viewed through the transparent container 20 and transparent plastic wrapper 86, provides an indication that the nutrient concentration has fallen to a level at which replacement of the cartridge is indicated.

For purposes of illustration, an example of a useful formulation for the cartridge is as follows:

| Component | Weight in Grams |
| --- | --- |
| Water | 437.5–700.0 |
| Fertilizer | 2274.4–3639.0 |
| Trace Elements | 1.4–2.3 |
| Dowcil | 0.16–1.0 |
| Gel | 134.7–215.5 |
| Floc | 60.6–80.0 |
| Liquid Calcium Mix | 184.4–295.0 |
| Dye (blue) | 28.0–45.0 |

The fertilizer used may be any one of a number of water soluble fertilizer formulations available for the specific treatment of lawns, flower gardens, vegetable gardens, etc. For example, for the fertilizing of lawns, fertilizers having: 30% to 40% nitrogen, 2% to 3% phosphoric acid and 2% to 3% soluble potash may be used. For providing nutriment to flower gardens, fertilizers having 11% to 15% nitrogen, 22% to 30% phosphoric acid and 11% to 15% soluble potash are preferably used, and for vegetable gardens, fertilizers having 15% to 20% nitrogen, 15% to 20% phosphoric acid and 15% to 20% soluble potash may be advantageously employed. The above formulations are standard fertilizer formulations and are indicated by way of illustration only, since it is clear that a fertilizer having virtually any analysis desired may be utilized where required.

The liquid calcium mix in the above formula consists of 60.5 to 96.8 grams of calcium, 0.6 to 0.9 grams of Methocel, 2.3 to 3.7 grams of yellow dye, and 121.0 to 193.6 grams of water.

The floc may be made of nylon, dacron or cotton fibers. Such floc comprises chopped fibers which are in the order of approximately one-sixteenth (1/16) inch in length.

The gel may be any one of a number of gel forming substances as described in U.S. Pat. No. 4,051,628 or may be made of other substances, subject to the requirement that the gel be water permiable and compatible with the nutrient material. Examples of suitable gel materials and sources of supply are Methocel K15M (Dow Chemical), Sodium silicate (PQ Corp.) and Burtonite V-7-E guar gum (Burtonite Co.).

The method for forming the cartridge will now be described. A mold is prepared having the desired geometrical configuration. This mold consists of the transparent plastic wrapper 86 into which is mounted a central post which forms the longitudinal bore of the cartridge. For this purpose, one of the end caps 88 is inserted on one end of the plastic wrapper 86, and the post inserted into the central opening of the end cap. The various components are prepared and weighed as indicated above. The water is poured into a mixing pot, the fertilizer, trace elements and Dowcil are added, and the mixture is stirred. Stirring is continued throughout the mixing process. The mixture is heated to a preferred temperature in the order of approximately 140° F. and is maintained at this approximate temperature throughout the remainder of the mixing process. The mixing is continued until the water and fertilizer become a homogenous slurry, whereupon the gel is added. When the fertilizer is thoroughly suspended, the floc is then added and thoroughly mixed in order to eliminate lumps and to become fluffed. The calcium mix is then added, and as soon as the calcium is mixed, pouring into the mold must be accomplished within three minutes and preferably one minute. One of the end caps had been previously placed on the mold. When the pouring is completed, the second end cap is slid over the post portion of the mold.

The mixture within the mold hardens in approximately one-half hour, after which the post is removed from the formed cartridge, and a plug is inserted into each end of the caps.

In the preferred embodiment, a perforated or screened tube 98 made of wire or plastic mesh, or the like, as described above is molded within the core body in position to surround the longitudinal bore 84. This tube reinforces the core and prevents breaking away of the gel and enlargement of the bore.

In the mixing process, the blue dye is added to the mix immediately after the fertilizer is added. The yellow dye is included in the liquid calcium mix so that after the liquid calcium mix is added and stirred, the production of a uniform green color will indicate that the calcium has been thoroughly mixed.

In use, as the water flows through the cartridge bore 84, the nutriment is released in a micro feeding amount. The release rate is preferably in the order of 5 to 25 parts nutriment per million parts of water. This rate may be varied by simply exposing more or less gel surface to the water stream. This may be accomplished by varying the diameter of the longitudinal bore or by forming the longitudinal bore with a non-circular cross-section such as elliptical, rectangular or star-shape.

The present invention provides a slow but accurate release of nutriments over a long period of time. The relative release rate remains substantially constant throughout approximately 85% to 95% of the useful life of the cartridge.

While preferred embodiments of the invention have been shown and described herein, it is obvious that numerous omissions, changes and additions may be made in such embodiments without departing from the spirit and scope of the invention.

What is claimed is:

1. A lawn and garden feeding apparatus for use with a source of water and with water discharge means,
    said feeding apparatus comprising
    a container having a water inlet opening and a water outlet opening, means for connecting said inlet opening to said source of water, and means for connecting said outlet opening to said water discharge means,
    a removable cartridge disposed within said container, said cartridge comprising a molded stable solid body of water insoluble but permeable hydrophilic gel containing a saturated solution of water soluble plant support reagent and a suspension of undissolved water soluble plant support reagent in solid form, and having a through unobstructed longitudinal bore communicating at one end with said inlet opening and at the other end with said outlet opening, whereby water flows through said longitudinal bore from said inlet opening to said outlet opening,
    said gel being adapted to release minute amounts of said plant support reagent into the water flowing through said longitudinal bore.

2. A lawn and garden feeding apparatus according to claim 1 in which said container is made of a transparent plastic and said cartridge is encased in a transparent plastic wrapper.

3. A lawn and garden feeding apparatus according to claim 2 in which said gel further includes a water soluble dye which combines with water flowing through said apparatus thereby indicating a change in chemical concentration of said chemical reagent after a period of use.

4. A lawn and garden feeding apparatus according to claim 1 in which said removable cartridge closely fits said container.

5. A lawn and garden feeding apparatus according to claim 1 in which said cartridge further includes a pair of end caps each having an opening communicating with said longitudinal bore, and a pair of removable plugs closing said openings in said end caps.

6. A lawn and garden feeding apparatus according to claim 1 in which said container and said cartridge are cylindrical and in which said bore has a circular cross-section.

7. A lawn and garden feeding apparatus according to claim 1 in which said bore has a non-circular cross-section comprising at least one curved surface.

8. A lawn and garden feeding apparatus according to claim 1 in which said bore has a non-circular cross-section comprising a plurality of connected planar surfaces.

9. A lawn and garden feeding apparatus according to claim 1 in which said plant support reagent comprises a fertilizer.

10. A lawn and garden feeding apparatus according to claim 1 in which said plant support reagent comprises a pesticide.

11. A lawn and garden feeding apparatus according to claim 1 in which said cartridge further includes a mesh tube disposed within said gel and encircling said bore.

12. A lawn and garden feeding apparatus according to claim 1 in which a measured quantity of floc is dispersed within said gel.

* * * * *